(12) United States Patent
Cipolla (10) Patent No.: US 6,769,704 B2
(45) Date of Patent: Aug. 3, 2004

(54) TRAILER HITCH STEP

(75) Inventor: James Cipolla, Little Falls, NJ (US)

(73) Assignee: Elegant USA, LLC, Totowa, NJ (US)

( * ) Notice: Subject to any disclaimer, the term of this patent is extended or adjusted under 35 U.S.C. 154(b) by 0 days.

(21) Appl. No.: 10/190,346

(22) Filed: Jul. 5, 2002

(65) Prior Publication Data

US 2003/0011164 A1 Jan. 16, 2003

Related U.S. Application Data

(60) Provisional application No. 60/303,333, filed on Jul. 6, 2001.

(51) Int. Cl.[7] ............................................. B60D 1/07
(52) U.S. Cl. .................... 280/163; 280/164.1; 280/500; 224/521
(58) Field of Search ............................. 280/163, 164.1, 280/164.2, 165, 166, 169, 504, 505, 506, 507, 511, 500, 502, 491; D12/162, 203; 224/519, 521; 296/62

(56) References Cited

U.S. PATENT DOCUMENTS

| | | | | |
|---|---|---|---|---|
| 4,662,647 A | * | 5/1987 | Calvert ..................... 280/490.1 |
| 5,149,122 A | * | 9/1992 | Helber ..................... 280/491.2 |
| 5,511,813 A | * | 4/1996 | Kravitz ....................... 280/495 |
| 5,593,172 A | * | 1/1997 | Breslin ....................... 280/506 |
| 5,829,774 A | | 11/1998 | Klemp |
| 5,975,553 A | * | 11/1999 | Van Vleet .................. 280/483 |
| 6,050,579 A | * | 4/2000 | Selland et al. ............. 280/163 |
| 6,105,989 A | * | 8/2000 | Linger ....................... 280/506 |
| 6,131,938 A | * | 10/2000 | Speer ......................... 280/506 |
| 6,145,865 A | | 11/2000 | Cannara et al. |
| 6,170,843 B1 | | 1/2001 | Maxwell et al. |
| 6,237,927 B1 | | 5/2001 | Debo |
| D444,754 S | * | 7/2001 | Storer ....................... D12/203 |

* cited by examiner

Primary Examiner—Brian L. Johnson
Assistant Examiner—Brian L Swenson
(74) Attorney, Agent, or Firm—Weingram & Associates, PC (57) ABSTRACT

A step for mounting in a trailer hitch which is adjustable in the vertical and horizontal positions. A joining member has displaced connecting ends sized to fit both a standard trailer hitch and a mounting bracket on the step. One or more fastening points in at least one of the connecting ends of the joining-member enables adjustment of the position of the joining member to the trailer hitch. Rotation and reversal of the joining member provides for a variety of adjustments in the vertical and horizontal position of the step with relation to the trailer.

10 Claims, 8 Drawing Sheets

TRAILER HITCH STEP

RELATED APPLICATIONS

This application claims priority from U.S. provisional application No. 60/303333, filed Jul. 6, 2001.

BACKGROUND OF THE INVENTION

1. Field of the Invention

The present invention relates to motor vehicles and more particularly to steps which are removably mountable to a trailer hitch of a vehicle.

2. Description of the Prior Art

Trailer hitches are well known. They are mounted to the chassis of an automobile or a truck, for example, for towing applications. The hitches take a variety of different forms and shapes and a common one protrudes from an end of the vehicle to receive a mounting device for coupling the towing vehicle to the towed vehicle. Many of the trailer hitches have a circular or rectangular cross-section and in addition, are open-ended so that a mating end of the mounting device such as a ball shaped member can be inserted into the hitch to enable the towing operation.

Vehicles for which the trailer hitches are used include station wagons, trucks such as flatbed and pick-up trucks, and the popular sport utility vehicle (SUV). In certain of these vehicles, particularly the pick-up trucks, the cargo portion of the vehicle to which the trailer hitch is mounted is not immediately accessible and therefore, it would be desirable to have a step which is removably mountable to the vehicle, such as at the trailer hitch, to access the cargo portion of the vehicle.

It would be desirable to have the step removably mounted to the cargo hitch so that when the step is not needed, it could be removed, stored, repaired or refurbished as necessary.

In addition, because the step would not be an integral part of the trailer hitch or the vehicle chassis, it would be desirable to have the position of the step vertically and horizontally adjustable with respect to the cargo floor.

It would also be desirable to have an anti-vibration feature for the step to reduce noise during driving at highway speed with the step in place.

Trailer hitch steps are known in the art. For, example U.S. Pat. No. 6,237,927 issued to Debo (2001) discloses a pull-out tailgate step that attaches to a truck trailer hitch. The step makes it possible to step from the ground to the tread of the step and then to the tailgate of the truck. Similarly, U.S. Pat. No. 6,170,843 issued to Maxwell, et al. (2001) discloses a step which is capable of being inserted into a trailer hitch. U.S. Pat. No. 6,145,865 issued to Cannara et al. (2000) discloses a combined trailer hitch cover and step assembly which acts as a step and a cover for the trailer hitch socket. U.S. Pat. No. 5,829,774 issued to Klemp (1998) shows a combination step and bumper assembly. However, while all of these devices are trailer hitch steps, none of these allows for adjusting both the vertical and horizontal placement of the step.

SUMMARY AND OBJECTS OF THE INVENTION

The present invention sets forth a step for mounting in a trailer hitch which is adjustable in the vertical and horizontal positions. A joining member has displaced connecting ends sized to fit both a standard trailer hitch and a mounting bracket on the step. One or more fastening points in at least one of the connecting ends of the joining member enables adjustment of the position of the joining member to the trailer hitch. Rotation and reversal of the joining member provides for a variety of adjustments in the vertical and horizontal position of the step with relation to the trailer.

Accordingly, it is an object of the present invention to provide a trailer hitch step which is easily removably mountable to a trailer hitch of a vehicle and can be easily positioned.

It is another object of the present invention to provide a step which is adapted to be vertically and horizontally displaced with respect to the trailer hitch to adjust the position of the step with respect to the trailer hitch or vehicle.

Yet another object of the present invention to provide a trailer hitch step which has an anti-vibration device for the step.

Still another object of the present invention to provide a trailer hitch step which has an anti-skid surface upon which a user can stand.

A further object of the present invention to provide a trailer hitch step which is durable and long-lasting.

It is another object of the present invention to provide a trailer hitch step which is easily adjustable to accommodate different vehicles and/or users.

It is another object of the present invention to provide a trailer hitch step which is stylish and does not detract from the aesthetics of the vehicle to which it is attached.

It is another object of the present invention to provide a trailer hitch step which can be easily disassembled to stow away when not in use.

It is another object of the present invention to provide a trailer hitch step which is strong and sturdy and can easily support the weight of its user.

A further object of the present invention to provide a trailer hitch step which is safe to use.

Another object of the present invention to provide a trailer hitch step which is of simple design and economical to construct yet offers wide flexibility in use.

These as well as further object and advantages of the present invention will become apparent to those skilled in the art from a review of the accompanying detailed description of the preferred embodiment, reference being made to the accompanying drawings.

DETAILED DESCRIPTION OF THE PREFERRED EMBODIMENTS

Referring to the Figures, there is shown a trailer hitch step assembly, generally indicated at 10 according to the present invention, having a step 11, and an L shaped connecting or forming member 22. The member 22 is intended to fit within and coact with a standard square tubed trailer hitch H.

Figure 1:
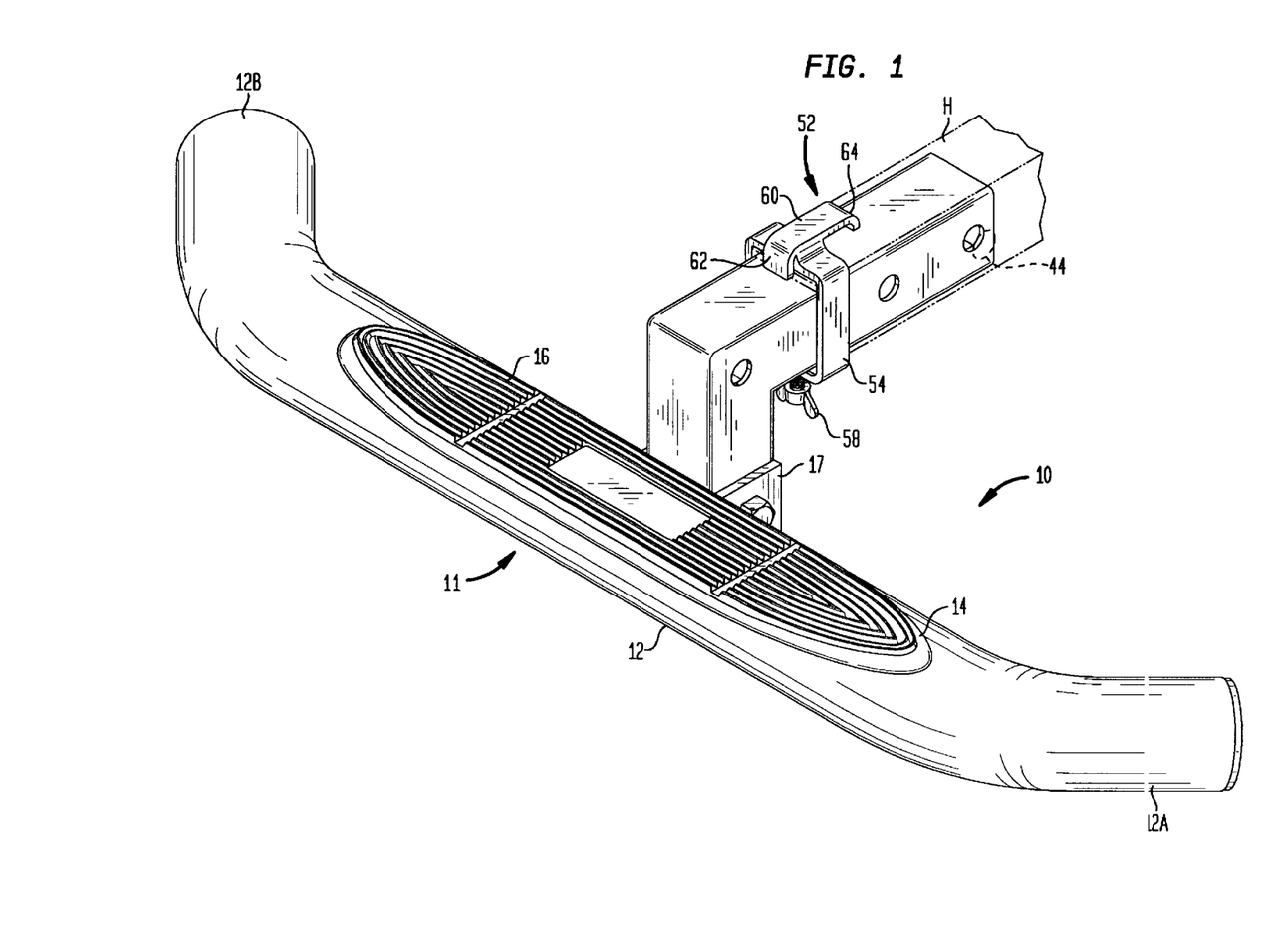
FIG. 1 shows a top front right side perspective view from the top front of the vehicle step of my new design.
Figure 2:
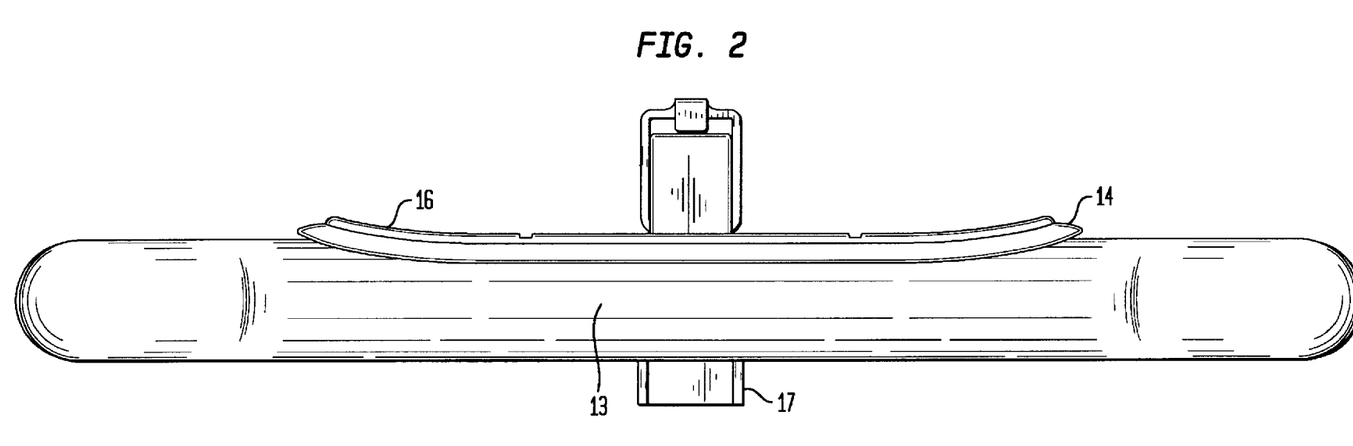
FIG. 2 is a front view of the vehicle step shown in FIG. 1.

The step 11 includes a tubular shaped member 12 having a cylindrical center section 13 and ends 12a and 12b which may be bent or slightly turned as shown in FIG. 1.

A flat surface 14 is formed on the top of the member 12 and is provided with anti-skid material to form a tread 16. The tread 16 is constructed from any of the known materials for this type of use, and may also be provided with surface contouring to reduce slippage. The tread 16 may also have indicia to indicate the model number, name of the manufacturer, or other indicia such as advertising or sponsorship.

The cross-section of the member 12 is preferably circular, as this shape is less likely to be adversely effected from vibration, racking stresses, and pressure exerted on the member 12 when in use and attached to the trailer hitch H of the vehicle.

Referring also to FIGS. 1,3,5,6,9 and 10, the step 11 includes bracket 17 having arms 18,20 which extend from the front 19 of the bracket 17 and is connected to the tubular center section 13. The bracket arms 18,20 are each provided with a corresponding aperture 18a,20a, respectively, which are in registration with each other.

Figure 4:
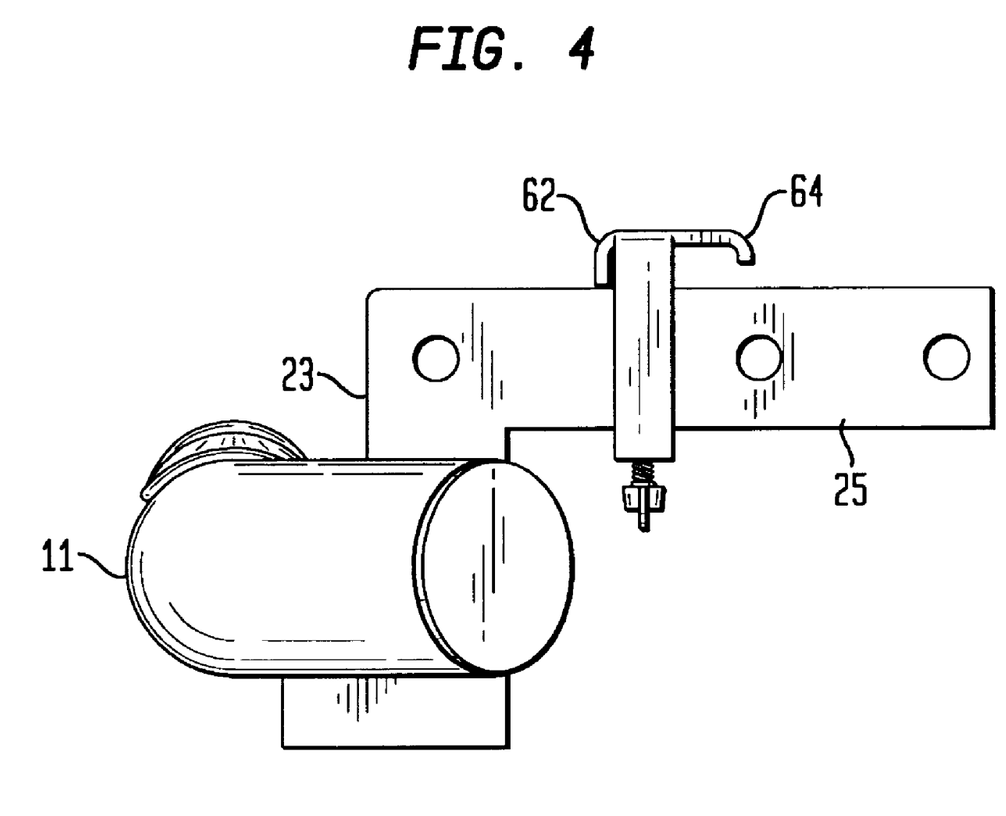
FIG. 4 is a right side view of the vehicle step shown in FIG. 1 which is a mirror image of the left side view.
Figure 5:
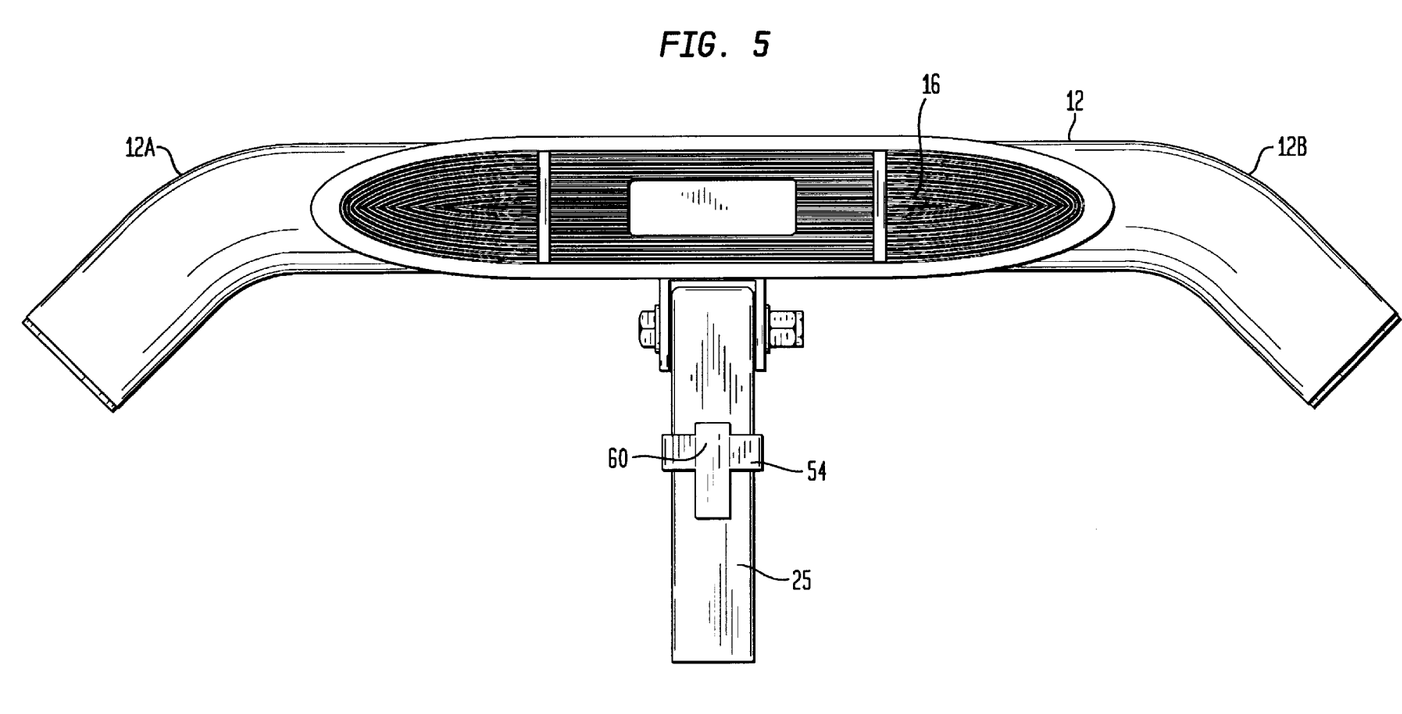
FIG. 5 is a top plan view of the vehicle step shown in FIG. 1.
Figure 6:
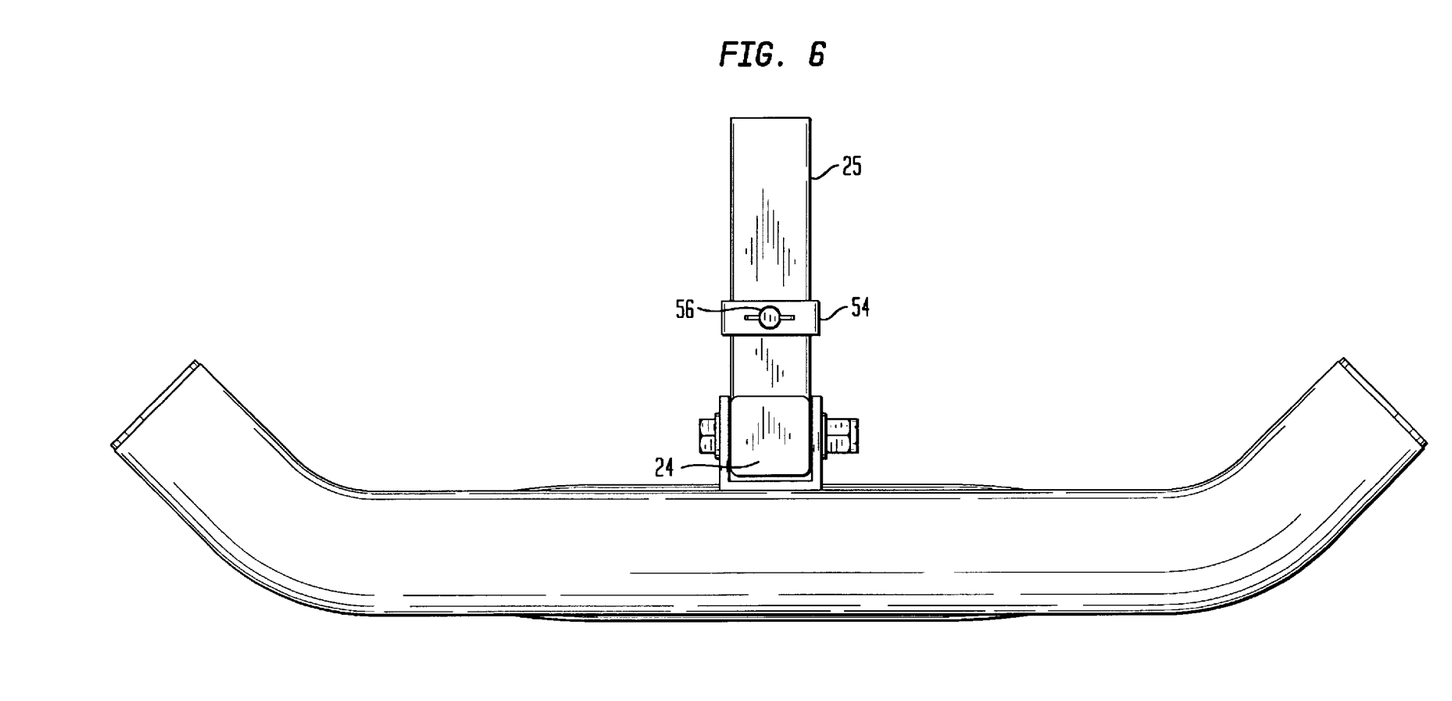
FIG. 6 is a bottom plan view of the vehicle step shown in FIG. 1.
Figure 7:
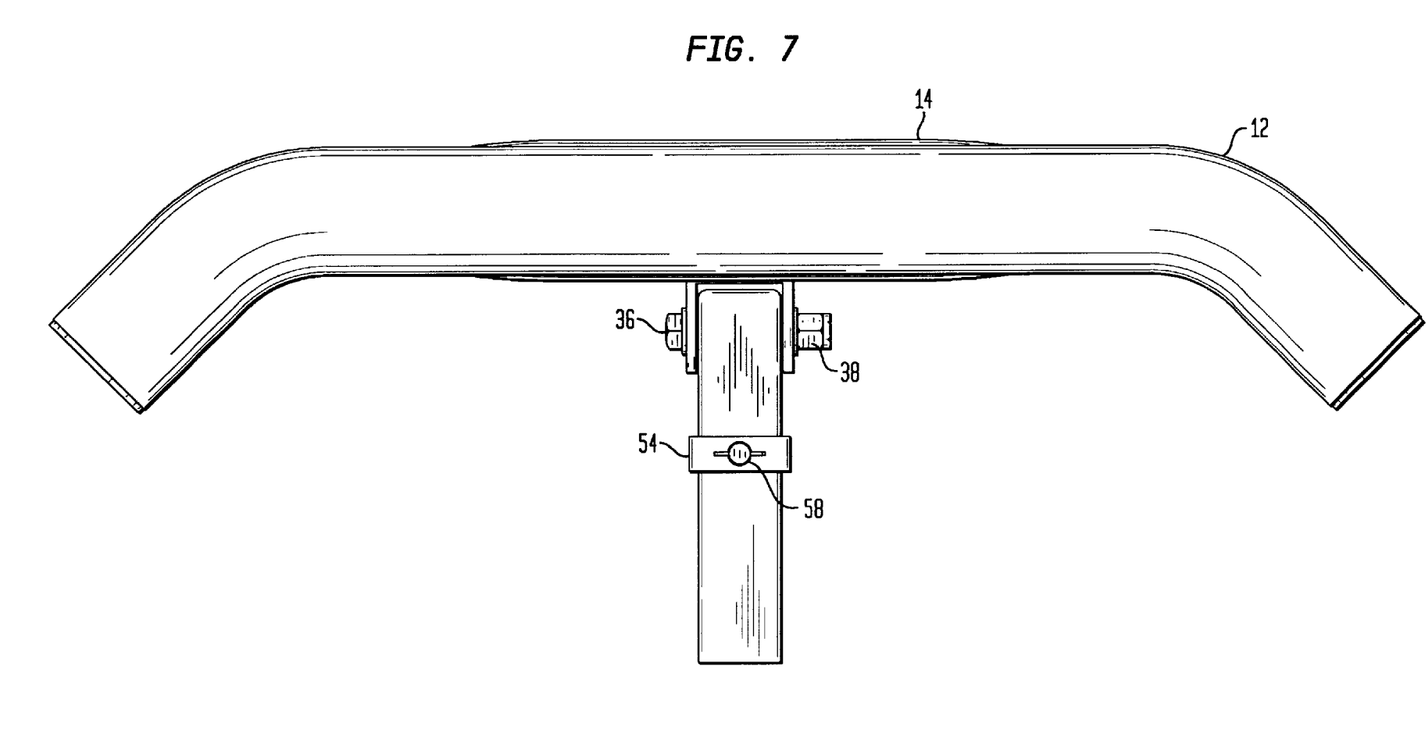
FIG. 7 is a bottom plan view of the vehicle step shown in FIG. 1 with the vehicle step positioned in an alternative raised position as shown in FIG. 8.
Figure 8:
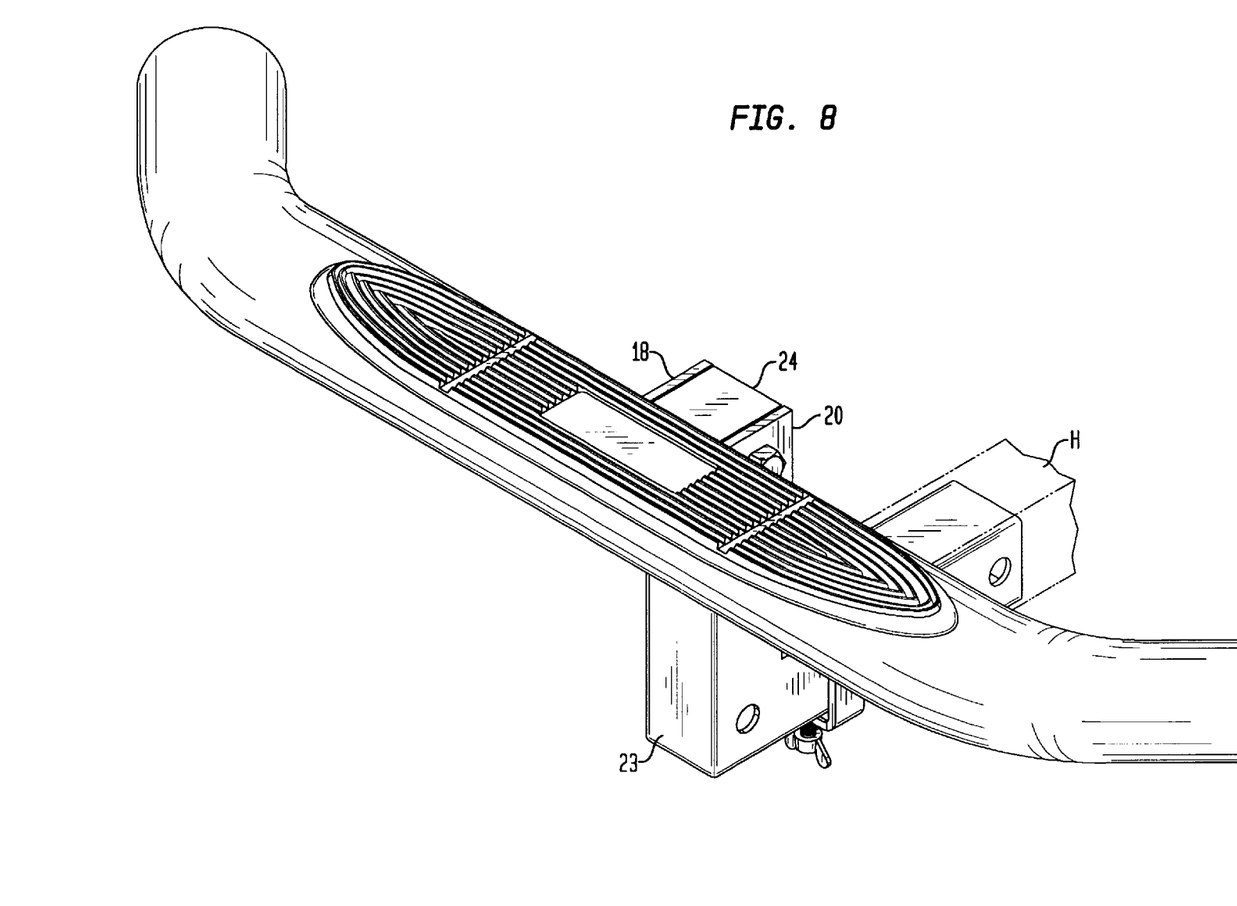
FIG. 8 is a top front right side perspective view of the vehicle step shown in FIG. 1 form the top front showing the vehicle step arranged in the alternate raised position.
Figure 10:
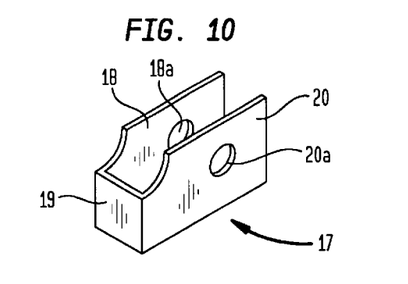
FIG. 10 is a perspective view of the bracket shown in FIG. 9.

Referring to FIG. 1,4 and 10 an L-shaped joining member 22 has a vertical leg 23 with a top end 24, and a horizontal leg 25 with an end 26. The L-shaped member has a rectangular cross-section made from tubing, and is sized and shaped so that vertical leg 23 and horizontal leg 25 of the member 22 can be received between the bracket arms 18,20. Each one of the legs 23,25 is provided with a plurality of sets of holes, i.e., holes 28 and 30 on leg 25 and holes 32 and 34 on vertical leg 23 that extend through both sides of the tubing.

Figure 3:
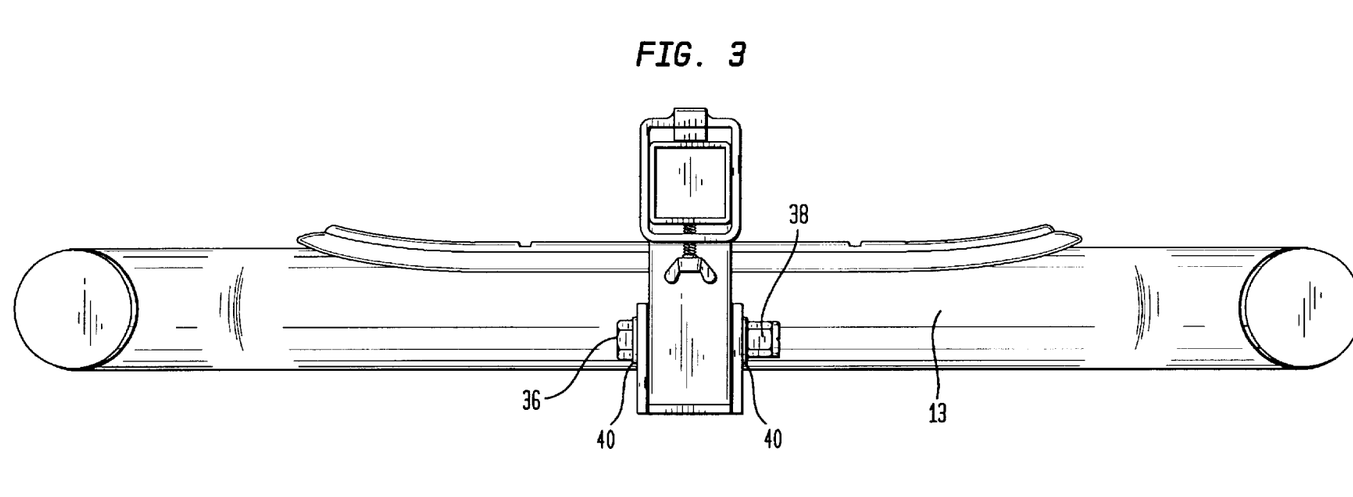
FIG. 3 is a rear view of the vehicle step shown in FIG. 1.
Figure 9:
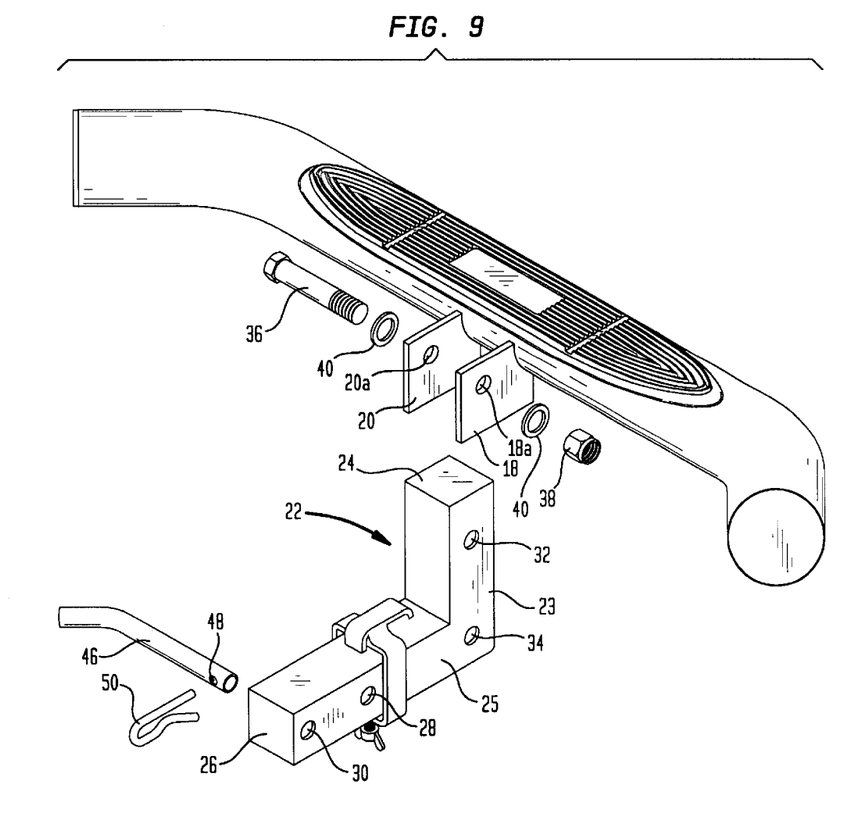
FIG. 9 is a view showing the components for adjustably mounting the step to a trailer hitch.

Referring to FIGS. 3 and 9, the vertical leg 23 of the L-shape member 22 is mounted between the bracket arms 18,20 of bracket 17 by a threaded bolt 36 and nut 38 passing through apertures 20a and 18a of the bracket and apertures 32 of vertical leg 23. Washers 40 are used to secure the nut 38 and the bolt 36 in a threaded position.

As shown in particular in FIGS. 1 and 3, the L-shaped joining member 22 can be mounted to the bracket arms 18,20 by having one of the sets of the holes 32–34 of the vertical leg 23 brought into registration between the holes 18a and 20a of bracket arms 18,20 for the bolt 36 to be guided through. Thus two different heights can be obtained for the step.

The height of the step can be further adjusted by rotating the L-shaped member 22 so that the vertical leg 23 is either above the horizontal leg 25 or below the horizontal leg 25. A mid position is available in which the horizontal leg would be below the vertical leg, and aperture of hole 34 would be connected to the arms 18,20 of the bracket.

As shown in the Figures, the end 26 of the horizontal leg of member 22 is sized and shaped to be removably received within the trailer hitch H. Alternatively, the end 24 of the vertical leg can be removably mounted to the hitch H. The hitch H is constructed with a hole 44 extending therethrough. Holes 28,30 in horizontal leg 25 of L-shaped member 22 are positioned to be in registration with the hole 44 in the hitch H. After end 26 of the horizontal leg 25 of member 22 has been inserted into the hitch H, a stud or pin 46 is inserted through the hole 44 of the hitch. The pin 46 has a hole 48 extending therethrough and into which a clip or cotter pin 50 is inserted to retain the pin 46 in position. Either hole 28 or 30 can be placed in registration with hole 44 in the trailer hitch H to provide for horizontal adjustment of the position of the step.

In view of the foregoing construction, it can be seen that the L-shaped member 22 can be used to adjust the position of the step 11 vertically by positioning the bracket arms 18 and 20 in registration with one of the selected holes 32 or 34 of the L-shaped member 22, and can be used to adjust the position horizontally by moving the end 26 of the member 22 into and out of the trailer hitch H to a preferred position by aligning the holes 28 or 30 with the hole 44 of the hitch H.

An anti-vibration member 52 of the step assembly 10 is shown in particular with respect to FIGS. 1,3 and 4. The member 52 consists of a collar 54 sized and shaped to receive end 26 of the L-shaped member 22 therethrough. The collar 54 is accordingly rectangular shaped, although it can be of another shape to conform to the cross-section of the member 22. As shown in FIG. 4, the collar 54 includes at one side thereof a threaded hole 56, through which a screw 58, such as a wing screw or butterfly nut 58, is mounted for tightening the collar 54 onto the member 22. An opposite end of the collar 54 is provided with a bracing member 60 having opposed ends 62,64. Each of the opposed ends 62,64 is bent in a direction toward the member 22 extending through the collar 54. The member end 62 extends further down the collar 54 to contact a surface of the joining member 22 when the screw 58 is tightened down as shown in FIG. 4 for example.

In contrast, the end 64 of member 60 is of a shorter downward length than the end 62 to accommodate the dimensions of the hitch H as shown in particular in FIG. 4. The shorter length of the end 64 provides clearance for the collar 54 to be slipped over the hitch H. When the screw 58 is tightened down, the longer end 62 braces against the joining member 22, while the shorter end 64 provides enough clearance for the hitch H to be received between the end 64 and the member 22. When the screw 58 has been tightened down for the bracing member 60 to brace the L-shape member 22 and therefore the step 11, vibration is substantially reduced, if not eliminated, at the step during towing. The bracing occurs simultaneously with respect to the bracing member 60 and the joining member 22, and the bracing member 60 and the hitch H.

The collar 54 is also preferably coated with a high density plastic material to prevent unnecessary scraping of the hitch H.

We have described the invention with the L shaped member 22 oriented with leg 25 horizontally disposed and leg 23 vertically disposed. The lengths of the legs 25 and 23 can be different lengths and the holes or apertures on each leg can be of different spacing as is shown herein. The cross sections of legs 23 and 25 can be sized so that each can be accommodated in the arms 18, 20, of bracket member 17 and in the end of trailer hitch H. Therefore the orientation of the L-shaped joining member 22 can be reversed so that orientation of leg 23 would become the horizontal leg, therefore giving an entirely different set of alternative mounting positions for the step 11 with relation to the trailer hitch H.

LEGEND FOR REFERENCE NUMBERS 10 step generally
11 step
12 tubular member
12a&b ends of tubular section
13 cylindrical section of 11
14 flattened surface
16 anti skid material
17 bracket member
19 front of bracket
18,20 extending arms of 17
18a 20a apertures in 18, 20
22 L-shaped joining member
23 vertical leg of 22
24 top end of 24
25 horizontal leg of 22
26 hitch end of 25
28,30 holes in 25
30,32 holes in 23
36 threaded bolt
38 nut
40 washers
42 cushionable cap
44 hole—in Hitch H
46 pin for 44
48 hole in 46
50 clip for 48
52 anti vibration member
54 collar
56 threaded hole in 54
58 screw in 56
60 bracing member on 54
62 opposed end—step side
64 opposed end—hitch side
h standard square tubed trailer hitch

What is claimed is:

1. A step assembly for mounting to a trailer hitch of a vehicle comprising:
 a step comprising:
  a tubular member having:
   a flattened surface formed on the cylindrical section of the tubular member;
    an antiskid surface formed on the flattened surface;
  a bracket member connected to the central section of the tubular member having:
   a front panel;
   arms extending from the front panel;
   an aperture in each arm of the arms extending from the front panel
   the arms of the bracket having arcuate shaped cut out portions in the portion adjacent the cylindrical section to conform to the shape of the cylindrical section for connecting the arms of the bracket member to the cylindrical section of the tubular member;
 an L-shaped joining member comprising:
  a vertical leg;
   at least one aperture passing through the vertical leg of the joining member;
   an end of the vertical leg of the L-shaped joining member;
  a horizontal leg;
   an end on the horizontal leg,
   at least one hole in the horizontal leg of the joining member;
  one of said vertical and said horizontal legs being longer than the other;
  the cross sections of both of said vertical and horizontal legs sized to fit the arms of said bracket member and a trailer hitch for reversible connection between said joining member and the arms of said bracket member and said trailer hitch;
 connecting means comprising:
  a threaded bolt, nut, and washers, operatively coacting with the apertures in the arms of the mounting bracket and the apertures vertical leg of the joining member;
 connecting means for connecting the joining member to the trailer hitch comprising:
  pin means and clip means for operatively coacting with an aperture in the horizontal leg of the joining member and a hole in a trailer hitch in registration with the apertures in the horizontal leg; and
 an antivibration member on said horizontal leg of said joining means having
  a collar,
  bracing members extending from said collar having contacting ends adapted to coact with the horizontal leg of the joining member, and an external surface of a trailer hitch to suppress the vibration of the joining member in the trailer hitch; and
  threaded means disposed in the collar of the antivibration member for tightening the contacting ends of the antivibration member against a trailer hitch and the horizontal leg of the joining member; and
 the vertical leg of the joining member disposed between the arms of the bracket member to position the step with relation to the horizontal leg of the joining member, and the horizontal leg of the joining member disposed in a trailer hitch to position the step with relation to the horizontal position of a trailer hitch.

2. A step assembly for mounting a trailer hitch comprising:
 a step,
 a bracket member extending from the step and fixed thereto and,
 at least one arm extending from the bracket member and,
 an aperture in each arm of the bracket member;
 a joining member having
 a vertical leg, and
 a horizontal leg;
 one of said vertical and said horizontal legs being longer than the other;
 the cross sections of both of said vertical and horizontal legs sized to fit the arms of said bracket member and a trailer hitch for reversible connection between said joining member and the arms of said bracket member and said trailer hitch;
 first fastening means connecting the joining member to the bracket member;
 the vertical leg of the joining member adapted to coact with the fastening means and bracket member extending from the step joined to the bracket member to position the step with relation to the joining member; and
 the horizontal leg of the joining member adapted to fit in a standard trailer hitch;

so that the horizontal leg of the joining member can be positioned to enable the vertical leg of the joining member to be above the horizontal joining leg and to be below the horizontal joining leg to thereby adjust the vertical height of the step;

a second fastening means adapted to connect the horizontal leg to a trailer hitch with relation to the joining member and a trailer hitch into which a joining member would be positioned.

3. The step assembly of claim 2 wherein the horizontal leg of the joining member has a plurality of apertures, the apertures adapted to coact with an aperture in a trailer hitch; and said second fastening means for connecting one of said apertures in the horizontal leg of the towing member to a trailer hitch to secure the horizontal leg of the joining means in a position corresponding to the location of a specific hole in registration with the hole of a trailer hitch to adjust the horizontal position of the joining member.

4. The step assembly of claim 2 wherein the bracket member has a plurality of arms;

apertures formed in each of the arms; and the arms of the bracket are disposed to receive and operatively coact with the vertical leg of joining member.

5. The step assembly of claim 2 further comprising a step assembly for mounting a trailer hitch comprising:

a bracket member extending from the step and fixed thereto and, at least one arm extending from the bracket member and, an aperture in each arm of the bracket member;

a joining member having a vertical leg, a horizontal leg fastening means connecting the joining member to the bracket member the vertical leg of the joining member adapted to coact with the bracket member extending from the step joined to the bracket member and the joining member to position the step with relation to the joining member; and the horizontal leg of the joining member adapted to fit in a standard trailer hitch; so that the horizontal leg of the joining member can be positioned to enable the vertical leg of the joining member to be above the horizontal leg and to be below the horizontal leg of the joining member to thereby adjust the vertical height of the step with relation to the joining member and a trailer hitch into which a joining member would be position.

6. The step assembly of claim 5 wherein the horizontal leg of the joining member has a plurality of apertures, the apertures adapted to coact with an aperture in a trailer hitch; and fastening means for connecting one of said apertures in the horizontal leg to the trailer hitch to secure the horizontal leg of the joining means in a position corresponding to the location of the specific hole in registration with a hole of a trailer hitch to adjust the position of the joining member.

7. The step assembly of claim 5 wherein the bracket member has a plurality of arms;

apertures formed in each of the arms;

the arms are disposed to receive and operatively coact with the vertical leg of joining member.

8. The step assembly of claim 2 further comprising;

an antivibration member having a collar; extending from said collar a bracing member, contacting ends extending from the bracing member adapted to contact the horizontal leg of the joining member, and a trailer hitch, and adjusting means to tighten the contacting legs against the horizontal leg of the joining member, and an external surface of a trailer hitch.

9. The step assembly of claim 5 further comprising;

an antivibration member having a collar; extending from said collar a bracing member, contacting ends extending from the bracing member adapted to contact the horizontal leg of the joining member, and a trailer hitch, and adjusting means to tighten the contacting legs against the horizontal leg of the joining member, and an external surface of a trailer hitch.

10. The step assembly of claim 2 wherein the horizontal and vertical legs of the joining member are similarly dimensioned to enable operative coaction between the horizontal and the vertical leg the joining member with the bracket extending from the step and with the end of the trailer hitch.

* * * * *